United States Patent
Menon et al.

(10) Patent No.: US 11,894,533 B2
(45) Date of Patent: Feb. 6, 2024

(54) ELECTRIC VEHICLE

(71) Applicant: Daimler AG, Stuttgart (DE)

(72) Inventors: Vikram Menon, Kawasaki (JP); Katsuhiko Matsumoto, Kawasaki (JP); Markus Uhl, Kawasaki (JP); Lars Schroeter, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 666 days.

(21) Appl. No.: 17/055,043

(22) PCT Filed: Apr. 25, 2019

(86) PCT No.: PCT/JP2019/017749
§ 371 (c)(1),
(2) Date: Nov. 12, 2020

(87) PCT Pub. No.: WO2019/230286
PCT Pub. Date: Dec. 5, 2019

(65) Prior Publication Data
US 2021/0218101 A1 Jul. 15, 2021

(30) Foreign Application Priority Data
May 28, 2018 (JP) .................................. 2018-101593

(51) Int. Cl.
*H01M 10/613* (2014.01)
*H01M 10/625* (2014.01)
(Continued)

(52) U.S. Cl.
CPC ............. *H01M 10/613* (2015.04); *B60K 1/04* (2013.01); *B60L 50/64* (2019.02);
(Continued)

(58) Field of Classification Search
CPC ............ H01M 10/613; H01M 10/625; H01M 50/249; H01M 10/6567; H01M 2220/20;
(Continued)

(56) References Cited

U.S. PATENT DOCUMENTS 9,533,570 B2 * 1/2017 Matsuda ................. B60L 58/26
2003/0094318 A1 * 5/2003 Chernoff .................. B60N 2/14
180/54.1
(Continued)

FOREIGN PATENT DOCUMENTS

DE 102016005516 A1 * 12/2016
GB 2443272 A * 4/2008 ............... B60K 1/04
(Continued)

OTHER PUBLICATIONS

Translated JP-2013173389-A (Year: 2023).*
(Continued)

*Primary Examiner* — James A Shriver, II
*Assistant Examiner* — Ian Bryce Shelton
(74) *Attorney, Agent, or Firm* — Crowell & Moring LLP (57) ABSTRACT

An electric vehicle includes a drive unit fitted to a rear axle of the electric vehicle to transmit drive power generated by a motor to rear wheels of the electric vehicle, an auxiliary electric device group including a plurality of auxiliary electric devices disposed in a cab area which is disposed under a cab of the electric vehicle and between side rails which constitute a ladder frame of the electric vehicle, a battery pack disposed between the drive unit and the auxiliary electric device group and between the side rails, a power distribution device disposed on an auxiliary electric device group side of the battery pack and between the side rails to distribute power from the battery pack to the auxiliary electric devices, and a drive power supply device
(Continued)

disposed on a drive unit side of the battery pack to supply power from the battery pack to the motor.

7 Claims, 8 Drawing Sheets

(51) Int. Cl.
  *H01M 50/249* (2021.01)
  *B60K 1/04* (2019.01)
  *B60L 50/64* (2019.01)

(52) U.S. Cl.
  CPC ....... *H01M 10/625* (2015.04); *H01M 50/249* (2021.01); *B60K 2001/0438* (2013.01); *B60K 2001/0483* (2013.01)

(58) Field of Classification Search
  CPC .............. B60K 1/04; B60K 2001/0438; B60K 2001/0483; B60K 2001/001; B60L 50/64; B60L 9/18; B62D 21/02; B60Y 2200/14; B60Y 2200/141; B60Y 2200/142; Y02E 60/10
  See application file for complete search history.

(56) References Cited

U.S. PATENT DOCUMENTS

| | | | |
|---|---|---|---|
| 2011/0174561 A1* | 7/2011 | Bowman | B60L 15/2009 180/65.245 |
| 2013/0192914 A1* | 8/2013 | Nakamori | B60L 50/64 180/68.5 |
| 2015/0147618 A1* | 5/2015 | Nakamori | B60L 53/14 429/96 |
| 2016/0190526 A1* | 6/2016 | Yamada | H01M 50/264 180/68.5 |
| 2017/0334310 A1* | 11/2017 | Yokoyama | B60L 58/26 |
| 2017/0368959 A1* | 12/2017 | Hara | H01M 50/242 |
| 2018/0339594 A1* | 11/2018 | Brown | B60W 20/15 |
| 2019/0351750 A1* | 11/2019 | Caliskan | B62D 21/07 |

FOREIGN PATENT DOCUMENTS

| | | | |
|---|---|---|---|
| JP | 11-180162 A | | 7/1999 |
| JP | 2001-97048 A | | 4/2001 |
| JP | 2008-166196 A | | 7/2008 |
| JP | 2008166196 A | * | 7/2008 |
| JP | 2012-76540 A | | 4/2012 |
| JP | 2012-86630 A | | 5/2012 |
| JP | 2013-173389 A | | 9/2013 |
| JP | 2013173389 A | * | 9/2013 |
| JP | 2013-230731 A | | 11/2013 |
| JP | 2014-58254 A | | 4/2014 |
| JP | 2014058254 A | * | 4/2014 |
| JP | 2016-113063 A | | 6/2016 |
| JP | 2016-139522 A | | 8/2016 |
| JP | 2016139522 A | * | 8/2016 |
| JP | 2017-7549 A | | 1/2017 |
| JP | 2017-196942 A | | 11/2017 |
| JP | 2017196942 A | * | 11/2017 |
| KR | 10-2004-0027624 A | | 4/2004 |
| WO | WO-2018055336 A1 | * | 3/2018 |

OTHER PUBLICATIONS

Translated JP-2014058254-A (Year: 2023).*
PCT/JP2019/017749, International Search Report dated Jul. 23, 2019 (Two (2) pages).
Chinese Office Action issued in Chinese application No. 201980035023.7 dated May 15, 2023, with partial English translation (Ten (10) pages).

* cited by examiner

ELECTRIC VEHICLE

TECHNICAL FIELD

The present invention relates to an electric vehicle.

BACKGROUND ART

From a viewpoint of reducing environmental burdens, development of electric vehicles, such as full electric cars using a motor as a power source for propulsion in place of an engine such as an internal combustion engine and hybrid electric cars using both an internal combustion engine and a motor, has been progressing. In such electric vehicles, a battery for driving the motor is mounted. Supplied with electric power from the battery, the motor generates power to move the vehicle.

In recent years, also in the field of commercial vehicles such as trucks, development of electric vehicles has been being promoted. For example, Patent Document 1 discloses a battery box holding structure for a commercial vehicle which provides improved collision safety.

CITATION LIST

Patent Document

[Pent Document 1] Japanese Patent Laid-Open No. 2016-113063

SUMMARY OF THE INVENTION

Problem to be Solved by the Invention

On an electric truck, which is a type of commercial electric vehicle, a variety of auxiliary electric devices, such as a temperature controller and a compressor, are mounted, and power from the battery is supplied to these auxiliary electric devices in addition to the drive system for propulsion. In this case, power from the battery is sent to a power distribution device, for example via a high-voltage wire, and then distributed by the power distribution device to the drive system and the auxiliary electric devices via high-voltage wires. The high-voltage wires are run, for example along the ladder frame of the vehicle and stably fixed to the ladder frame at positions on a path to each device/system. From the viewpoints of ease of maintenance, high-voltage safety, and reduction in weight and cost achieved by reducing the length of high-voltage wires, a simple arrangement of high-voltage wires is desired.

The present invention has been made in view of the above situation. An object of the present invention is to provide, in the field of electric vehicles, an electric truck configured to enable a simple arrangement of high-voltage wires.

Arrangement for Solving the Problem

First Aspect of the Invention

A first aspect of the present invention is an electric vehicle comprising a drive unit fitted to a rear axle of the vehicle to transmit drive power generated by a motor to rear wheels of the vehicle to move the vehicle, an auxiliary electric device group including a plurality of auxiliary electric devices arranged in a cab area present under a cab of the vehicle and between side rails constituting a ladder frame of the vehicle, a battery pack arranged between the drive unit and the auxiliary electric device group and between the side rails of the ladder frame, a power distribution device arranged on the auxiliary electric device group side of the battery pack and between the side rails of the ladder frame to distribute power from the battery pack to the auxiliary electric devices, and a drive power supply device arranged on the drive unit side of the battery pack to supply power from the battery pack to the motor.

In the electric vehicle according to the first aspect, the auxiliary electric device group is arranged in the cab area present under the cab, the drive unit for moving the vehicle is fitted to the rear axle, the battery pack is arranged between the drive unit and the auxiliary electric device group and between the side rails, and the power distribution device for distributing power from the battery pack to the auxiliary electric devices included in the auxiliary electric device group is arranged on the auxiliary electric device group side of the battery pack and between the side rails. Accordingly, in the electric vehicle, the auxiliary electric device group, the power distribution device and the battery pack are arranged in this order from the front along the longitudinal direction of the vehicle, between the side rails. This arrangement allows the auxiliary electric device group and the power distribution device as well as the power distribution device and the battery pack, between which high-voltage power is transmitted, to be connected by high-voltage wires of shortest possible length or connected directly by coupling electrodes. The first aspect of the present invention can thus provide an electric vehicle in which components between which high-voltage power is transmitted are arranged at a short distance from each other, and thus, connected by high-voltage wires of reduced length or without wires. This enables simple arrangement of high-voltage wires.

Second Aspect of the Invention

A second aspect of the present invention is an electric vehicle according to the first aspect in which the power distribution device is arranged at a front exterior surface of the battery pack viewed along the longitudinal direction of the vehicle.

In the electric vehicle according to the second aspect, the power distribution device is arranged at the front exterior surface of the battery pack viewed along the longitudinal direction of the vehicle. In other words, the power distribution device and the battery pack are directly connected physically without a change in the order of arrangement of the auxiliary electric device group, the power distribution device and the battery pack. Accordingly, in the electric vehicle according to the second aspect, the power distribution device and the battery pack can be electrically connected by a high-voltage wire of reduced length or directly by coupling electrodes.

Third Aspect of the Invention

A third aspect of the present invention is an electric vehicle according to the first aspect in which the power distribution device is arranged away from the front exterior surface of the battery pack viewed along the longitudinal direction of the vehicle.

In the electric vehicle according to the third aspect, the power distribution device is arranged away from the front exterior surface of the battery pack viewed along the longitudinal direction of the vehicle. This configuration provides increased freedom of arrangement of the power distribution device without a change in the order of arrangement of the auxiliary electric device group, the power distribution device and the battery pack.

Fourth Aspect of the Invention

A fourth aspect of the present invention is an electric vehicle according to the first aspect in which the power distribution device is arranged at the front interior surface of the battery pack viewed along the longitudinal direction of the vehicle.

In the electric vehicle according to the fourth aspect, the power distribution device is arranged at the front interior surface of the battery pack viewed along the longitudinal direction of the vehicle. In this case, the high-voltage connection at which the battery pack and the power distribution device are electrically connected is located within the casing of the battery pack and not exposed, which contributes to safety.

Fifth Aspect of the Invention

A fifth aspect of the present invention is an electric vehicle according to any of the first to fourth aspects in which the auxiliary electric device group includes a shelf structure having a plurality of shelves arranged one over another in the vertical direction of the vehicle, and the auxiliary electric devices are arranged in the shelf structure, thereby grouped together.

In the electric vehicle according to the fifth aspect, the shelf structure having a plurality of shelves arranged one over another is arranged in the cab area present under the cab of the vehicle. In other words, the shelf structure is arranged in the space corresponding to the engine room of a conventional cab over engine truck, and holds the auxiliary electric devices together by using the vertical dimension of the space effectively. In the electric vehicle according to the fifth aspect, the shelf structure having a plurality of shelves arranged one over another enables a simple arrangement of high-voltage wires in the space corresponding to the engine room, and provides enhanced ease of maintenance of the auxiliary electric devices held therein.

Sixth Aspect of the Invention

A sixth aspect of the present invention is an electric vehicle according to any of the first to fifth aspects in which the battery pack has a power feed port for feeding power to the drive power supply device, the power feed port being provided at a rear exterior surface of the battery pack viewed along the longitudinal direction of the vehicle, between the side rails.

In the electric vehicle according to the fifth aspect, the power feed port for feeding power to the drive power supply device is provided at the rear exterior surface of the battery pack viewed along the longitudinal direction of the vehicle, between the side rails. This configuration reduces the risk of the power feed port being damaged, for example by collision of flying stones thrown up by the rear wheels of the traveling electric vehicle, and thus, eliminates the need to provide an impact protection cover which is normally required, leading to a reduction in the number of components. Further, the location of the power feed port between the side rails reduces the risk of the power feed port being damaged in a lateral collision accident of the electric vehicle.

Seventh Aspect of the Invention

A seventh aspect of the present invention is an electric vehicle according to any of the first to sixth aspects in which the battery pack has a piping port through which a coolant circulating in the battery pack flows into or out of the battery pack, the piping port being provided at the front exterior surface of the battery pack viewed along the longitudinal direction of the vehicle.

The electric vehicle according to the seventh aspect has a cooling system which circulates a coolant in the battery pack to keep down a temperature increase in the battery pack, wherein the piping port through which the coolant flows into or out of the battery pack is provided at the front exterior surface of the battery pack. Providing the piping port of the battery pack on the auxiliary electric device group side of the battery pack enables a simple piping arrangement of the cooling-system, in addition to a simple arrangement of high-voltage wires.

Eighth Aspect of the Invention

An eighth aspect of the present invention is an electric vehicle according to any of the first to seventh aspects in which the drive power supply device is arranged in front of the drive unit viewed along the longitudinal direction of the vehicle.

In the electric vehicle according to the eighth aspect, the drive power supply device is arranged in front of the drive unit viewed along the longitudinal direction of the vehicle, so that the battery pack, the drive power supply device and the drive unit are arranged in this order from the front along the longitudinal direction of the vehicle, between the side rails. This arrangement allows the battery pack and the drive power supply device as well as the drive power supply device and the drive unit, between which high-voltage power is transmitted, to be connected by high-voltage wires of short length. In other words, in the electric vehicle according to the eighth aspect, the components between which high-voltage power is transmitted are arranged at a short distance from each other, and thus, connected by high-voltage wires of reduced length. This enables a simple arrangement of high-voltage wires.

MODE OF CARRYING OUT THE INVENTION

With reference to the accompanying drawings, embodiments of the present invention will be described in detail. The present invention is not limited to the description given below; it can be carried out with any desired alteration that does not change the essentials thereof. The drawings used in explanation of the embodiments show components, schematically; in order to help understanding, the drawings may contain partial emphasis, enlargement, contraction, omission or the like, and thus, may not necessarily show the components on an accurate scale and in an accurate shape.

First Embodiment

Figure 1:
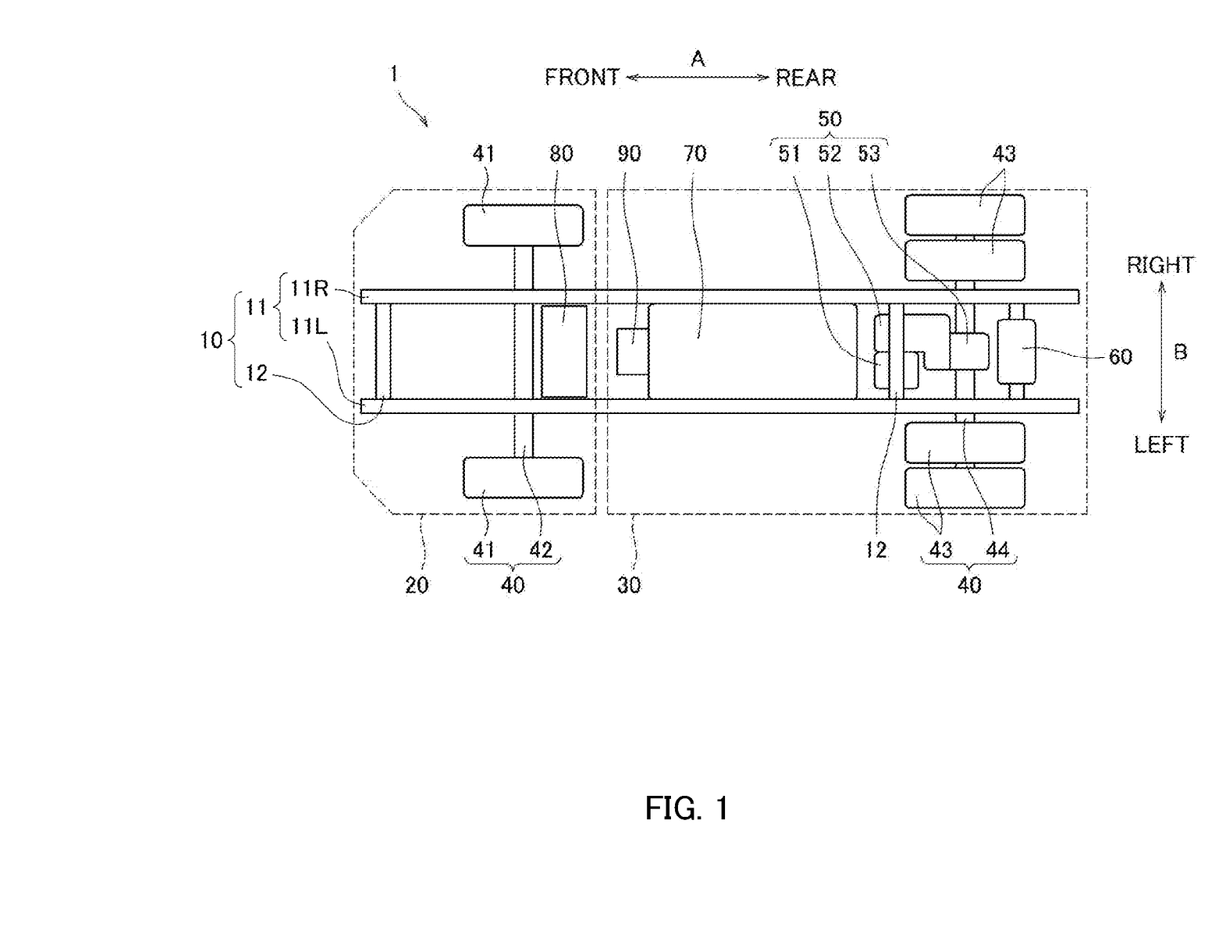
FIG. 1 is a top view schematically showing the total configuration of an electric vehicle according to a first embodiment of the present invention.

FIG. 1 is a top view schematically showing the total configuration of an electric vehicle 1 according to a first embodiment of the present invention. As shown in FIG. 1, the electric vehicle 1 according to the present embodiment is an electric truck comprising a ladder frame 10, a cab 20, a cargo box 30, a wheel system 40, a drive unit 50, a drive power supply device 60, a battery pack 70, an auxiliary electric device group 80 and a power distribution device 90. FIG. 1 represents the ladder frame, etc. seen from the top of the electric vehicle 1 through the cab 20 and the cargo box 30.

Although in the present embodiment, the electric vehicle 1 is a full electric car having an electric motor (motor 51 described below) as a drive source for propulsion, the electric vehicle 1 may be a hybrid electric car having also an engine. Further, the electric vehicle 1 is not limited to the electric truck but may be another type of commercial vehicle equipped with a battery for moving the vehicle, such as an electric garbage truck.

The ladder frame 10 comprises side rails 11 and cross-members 12. The left and right side rails 11L, 11R extend in the longitudinal direction A of the electric vehicle 1, parallel to each other and away from each other in the transverse (width) direction B of the vehicle. The left and right side rail 11L, 11R are connected by the cross-members 12 to form a ladder-shaped frame 10 called a ladder frame. The ladder frame 10 supports the cab 20, the cargo box 30, the drive unit 50, the drive power supply device 60, the battery pack 70, the auxiliary electric device group 80, the power distribution device 90 and other heavy objects mounted on the electric vehicle 1.

The cab 20 is a structure with a driver's seat, not shown, and arranged over the front of the ladder frame 10. The cargo box 30 is a structure into which cargo to be transported by the electric vehicle 1 is loaded, and arranged over the rear of the ladder frame 10.

In the present embodiment, the wheel system 40 comprises left and right front wheels 41 and a front axle 42 including shafts for the two front wheels 41, arranged in the front of the vehicle, and rear wheels 43, specifically two left rear wheels and two right rear wheels, and a rear axle 44 including shafts for the rear wheels 43, arranged in the rear of the vehicle. In the electric vehicle 1 according to the present invention, the rear wheels 43 are drive wheels to which drive power is transmitted to move the electric vehicle 1. The wheel system 40 is fitted to the ladder frame 10 by a suspension system, not shown, and supports the weight of the electric vehicle 1.

The drive unit 50 comprises a motor 51, a speed reducing mechanism 52 and a differential mechanism 53. Supplied with AC power from the drive power supply device 60 described below, the motor 51 generates drive power required to move the vehicle 1. The speed reducing mechanism 52 comprises a plurality of gears, not shown, and transmits drive power (rotation) generated by the motor 51 to the differential mechanism 53 at a reduced speed. The differential mechanism 53 distributes power transmitted from the speed reducing mechanism 53 to the left and right rear wheels 43. In other words, the drive unit 50 is configured such that drive power generated by the motor 51 reduced in speed by the speed reducing mechanism 52 to a level suited for moving the vehicle and transmitted via the differential mechanism 53 to the rear axle 44. The drive unit 50 can thus rotate the rear wheels 43 via the rear axle 44, thereby moving the electric vehicle 1.

The drive unit 50 is arranged on the inner side of each side rail 11L, 11R, where the term "inner" is used in connection with the transverse direction B of the vehicle. In other words, the drive unit 50 is arranged in the space between the side rails, and connected to the ladder frame 10 by support members, not shown.

The drive power supply device 60 is an inverter which converts DC power from the battery pack 70 into AC power and supplies it to the motor 51. The drive power supply device regulates the rotational speed of the motor 51 according to operation of an accelerator in the electric vehicle 1.

The battery pack 70 is a secondary battery provided as an for moving the electric vehicle 1. It supplied power to the motor 51 and the auxiliary electric device group 80. In order to store the power required for the electric vehicle 1, the battery pack comprises a plurality of battery modules (not shown) with a large capacity and a relatively large size. As will be described later in detail, the battery pack 70 is configured to be able to supply power in the longitudinal direction A of the vehicle, to the front and the rear of the vehicle, independently. In the present embodiment, the battery pack 70 is arranged between the left and right side rails 11L, 11R with respect to the transverse direction B of the vehicle and in front of the drive unit 50 with respect to the longitudinal direction A of the vehicle. The battery pack 70 is, for example attached or fixed to the ladder frame 10 by connecting members, not shown.

As will be described later in detail, the auxiliary electric device group 80 includes auxiliary electric devices 82 to 85 supplied with power from the battery pack 70 to operate. The auxiliary electric device group 80 is arranged in a space under the cab 20 called a cab area, and between the left and right side rails 11L, 11R with respect to the transverse direction B of the vehicle. The cab area is a space corresponding to the engine room of a conventional cab over engine truck. In the present embodiment, by way of example only, the auxiliary electric device group 80 includes four auxiliary electric devices 82 to 85; the number of auxiliary electric devices is not limited to four.

The power distribution device 90 is a so-called PDU (power distribution unit) which distributes power from the battery pack 70 to the auxiliary electric devices 82 to 85 included in the auxiliary electric device group 80. The power distribution device 90 is arranged on the auxiliary electric device group 80 side of the battery pack 70 and between the left and right side rails 11L, 11R with respect to the transverse direction B of the vehicle. The detailed description of the arrangement and connection of the auxiliary electric device group 80 relative to the battery pack 70 will be given later.

Figure 2:
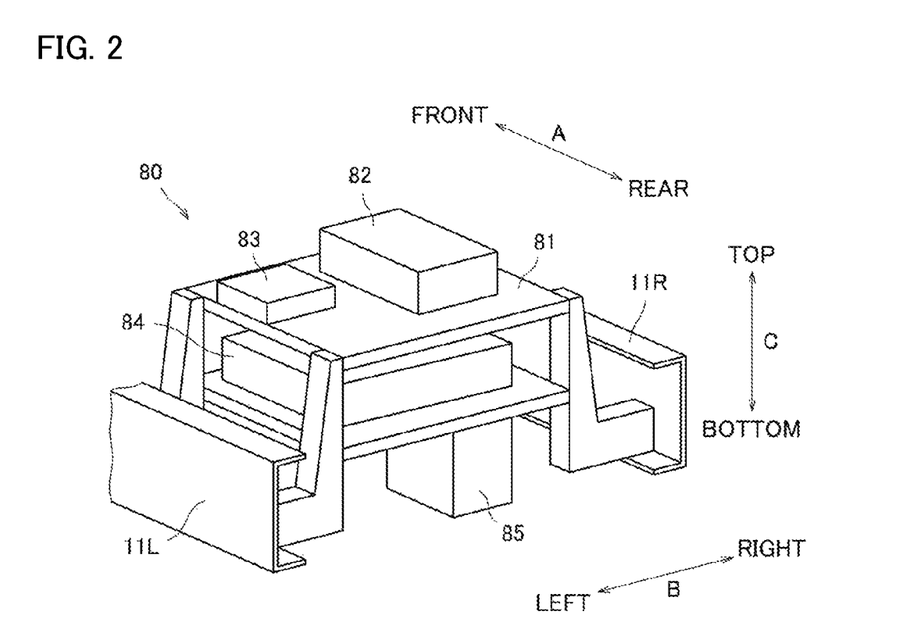
FIG. 2 is a perspective view schematically showing the configuration of an auxiliary electric device group.

Next, the configuration of the auxiliary electric device group 80 will be described in detail. FIG. 2 is a perspective view schematically showing the configuration of the auxiliary electric device group 80. As shown in FIG. 2, the auxiliary electric device group 80 comprises a shelf structure 81 having a plurality of shelves arranged one over another in the vertical direction C of the vehicle, and the auxiliary electric devices 82 to 85 arranged in the shelf structure 81, thereby grouped together.

The shelf structure 81 is arranged between and fixed to the left and right side rails 11L, 11R, and the auxiliary electric devices 82 to 85 are arranged therein. Here, the auxiliary electric devices 82 to 85 are arranged in the shelf structure 81 with their sides exposed for ease of maintenance.

The auxiliary electric devices 82 to 85 are electric devices which consume electric power in the electric vehicle 1 for purposes other than propulsion; they are, for example a temperature controller for controlling temperature in the cab 20, an in-vehicle charger, a compressor, and an DC-DC converter which converts power from the power distribution device 90 into appropriate voltage to supply electric components operating at low voltage.

In the shelf structure 81, if an auxiliary electric device 82 high in water resistance is fixed to a lower shelf while auxiliary electric devices 82, 83 low in water resistance are fixed to an upper shelf, it reduces the risk of a failure occurring in the auxiliary electric device group 80 even if the traveling electric vehicle 1 splashes rainwater from the road surface, for example. Here, the terms "upper" and "lower" are used in connection with the vertical direction C or the vehicle.

Figure 3:
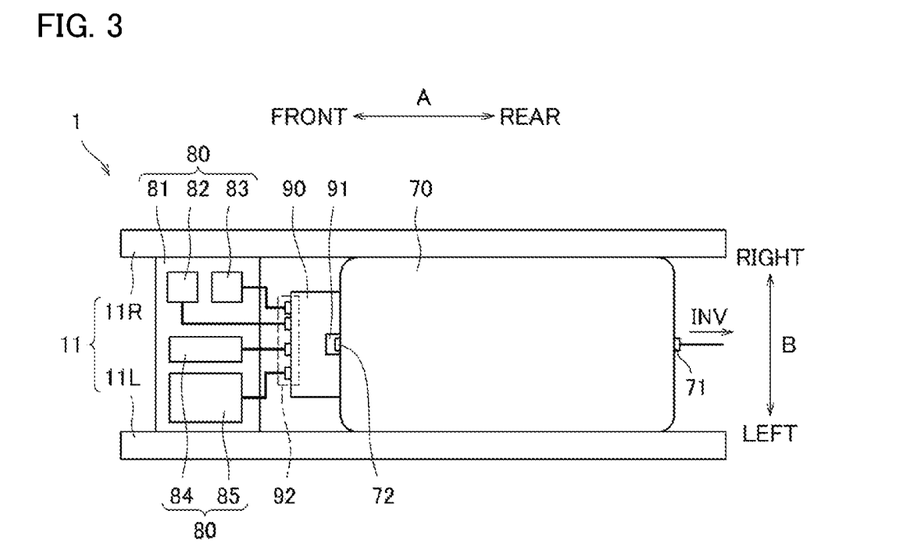
FIG. 3 is a configuration diagram schematically showing power feed lines in the electric vehicle according to the first embodiment of the present invention.

Next, power feed lines from the battery pack 70 will be described. FIG. 3 is a configuration diagram schematically showing power feed lines in the electric vehicle 1 according to the first embodiment of the present invention. In other words, FIG. 3 is a conceptual diagram showing how the auxiliary electric device group 80, the power distribution device 90 and the battery pack 70 are electrically connected.

As shown in FIG. 3, the battery pack 70 has, at a rear exterior surface, a rear power feed port 71 ("power feed port" in claims) to which a high-voltage wire is connected to deliver DC power to the drive power supply device 60, and at a front exterior surface, a front power feed port 72 to deliver DC power to the power distribution device 90. Here, the terms "rear" and "front" are used in connection with the longitudinal direction A of the vehicle.

Figure 4:
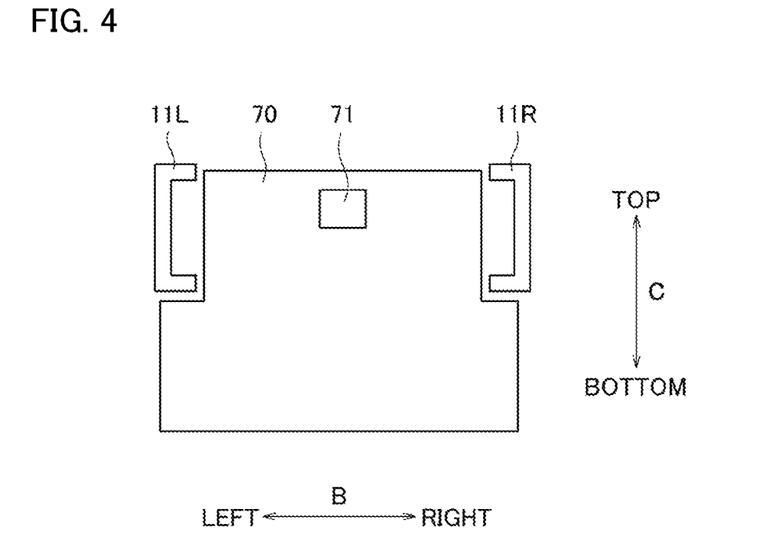
FIG. 4 is a rear view of a battery pack showing the location of a rear power feed port.

FIG. 4 is a rear view of the battery pack 70 showing the location of the rear power feed port 71. In other words, FIG. 4 shows the battery pack 70 viewed from the rear of the electric vehicle 1, in the longitudinal direction A. In the present embodiment, when viewed from the rear of the electric vehicle 1 in the longitudinal direction A, the battery pack 70 of large size and large capacity is an inverted T shape adapted for a space extending between and below the left and right side rails 11L, 11R of the ladder frame 10. The battery pack 70 is not limited to the shape shown in FIG. 4. The battery pack 70 may be a shape allowing the battery pack 70 to be located at least partly between the side rails 11.

As shown in FIG. 4, the rear power feed port 71 is provided at the rear exterior surface of the battery pack 70 to be located between the left and right side rails 11L, 11R. Desirably, the rear power feed port 71 is arranged at an upper location between the side rails 70, where the term "upper" is used in connection with the vertical direction C of the vehicle. The upper location reduces the risk of the rear power feed port 71 being damaged, for example by collision of flying stones thrown up by the rear wheels 43 of the traveling electric vehicle 1. Further, the arrangement of the rear power feed port 71 between the side rails 11 reduces the risk of the rear power feed port 71 being damaged in a lateral collision accident of the electric vehicle 1.

Referring back to FIG. 3, in the present embodiment, the power distribution device 90 is arranged at the front exterior surface of the battery pack 70. At the surface adjacent to the battery pack 70, the power distribution device 90 has a power input through which to receive power from the battery pack 70. In the present embodiment, by way of example, the power input 91 of the power distribution device 90 is a recessed electrode while the power feed port 72 of the battery pack 70 is a projecting electrode. The battery pack 70 and the power distribution device 90 are thus electrically connected directly by coupling the electrodes without using a high-voltage wire. The electrodes forming the front power feed port 72 and the power input 91 are not limited to this configuration.

The power distribution device 90 has power outputs 92 through which to distribute power from the battery power 70 to the auxiliary electric devices 82 to 85 included in the auxiliary electric device group 80. The auxiliary electric device group 80 is arranged right in front of the power distribution device 90 in the longitudinal direction A of the electric vehicle 1. This allows high-voltage wires connecting the auxiliary electric devices 82 to 85 to the power outputs 92 of the power distribution device 90 to be relatively short.

Although in the present embodiment, the power distribution device 90 is arranged at the front exterior surface of the battery pack 70, the power distribution device 90 may be arranged at another location on the auxiliary electric device group 28 side of the battery pack 70. In other words, the power distribution device 90 may be arranged in front of the front exterior surface of the battery pack 70 or within the casing of the battery pack 70 and in front of the batter modules (not shown) held in the casing. Variations of arrangement of power distribution device 90 will be described below as different embodiments.

The rear power feed port 71 for feeding power from the battery pack 70 to the drive power supply device 60 is provided at the rear exterior surface of the battery pack 70. The rear exterior surface of the battery pack 70 larger in capacity, and thus, larger in size is located nearer to the drive power supply device 60, which allows the high-voltage wire connecting the battery pack 70 to the drive power supply device 60 to be shorter.

Figure 5:
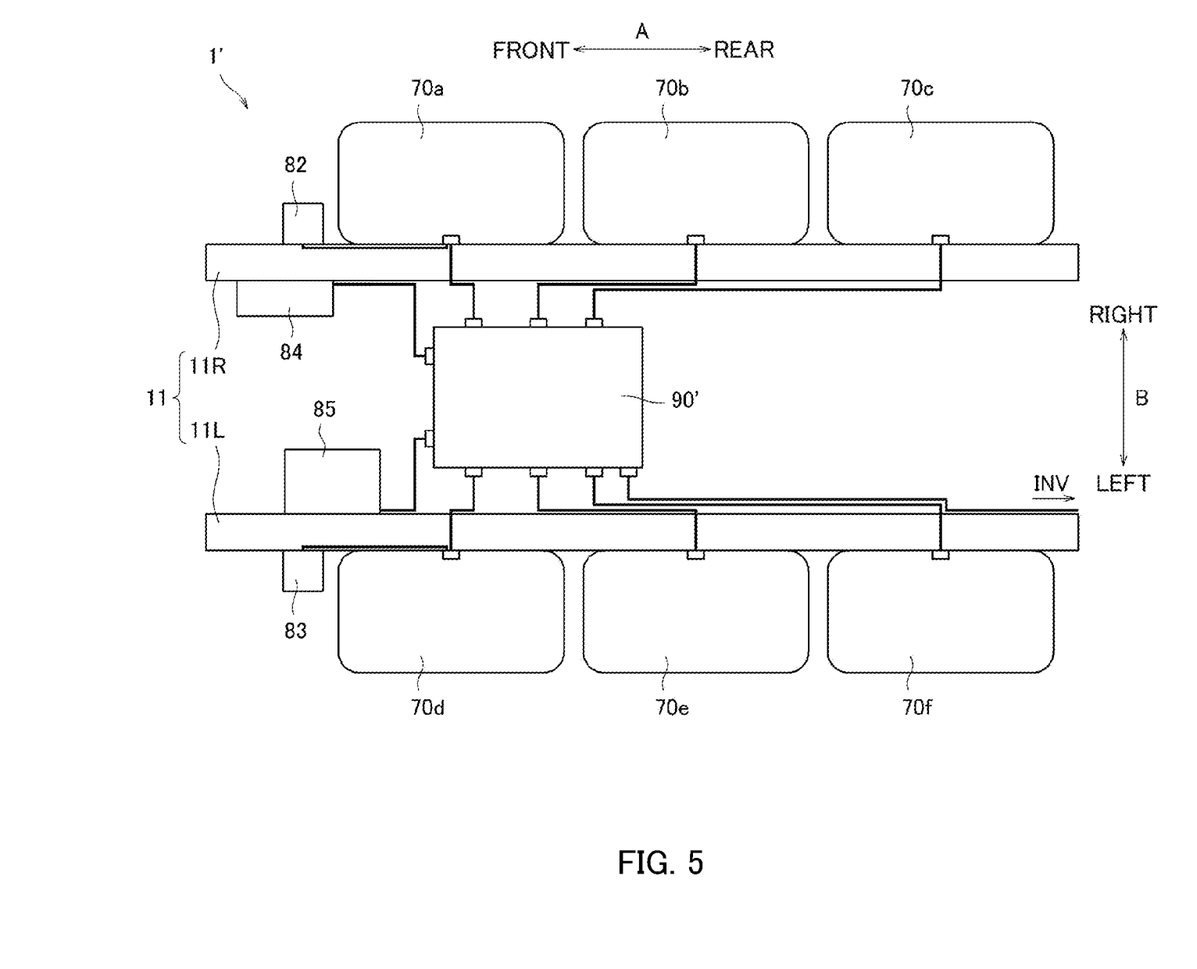
FIG. 5 is a configuration diagram schematically showing power feed lines in a comparative example of electric vehicle.

Next, advantageous effects of the electric vehicle 1 according to the present invention will be described in comparison with a comparative example. FIG. 5 is a configuration diagram schematically showing power feed lines in an electric vehicle 1' presented as a comparative example.

The electric vehicle 1' presented as a comparative example in FIG. 5 has battery packs 70a to 70f arranged at the outer side of each side rail 11, where the term "outer" is used in connection with the transverse direction B of the vehicle, and a power distribution device 90' which receives power from the battery packs 70a to 70f via high-voltage wires. The electric vehicle 1' further has auxiliary electric devices 82 to 85 each fixed to either of the side rails 11. The auxiliary electric devices 82, 83 are connected to the battery packs 70a, 70d by high-voltage wires, respectively, while the auxiliary electric devices 84, 85 are connected to the power distribution device 90' by high-voltage wires.

The electric vehicle 1' configured such that the components are electrically connected to each other by high-voltage wires has an increased number of high-voltage wires of increased length. Suppose that the power distribution device 90' is moved further to the front of the vehicle so that it can be connected to the auxiliary electric devices 82 to 89 by high-voltage wires of reduced length. In that case, a longer high-voltage wire is required to connect the power distribution device 90' to the drive power supply device 60. Further, the electric vehicle 1' with an increased number of power feed ports has an increased size and weight.

By contrast, in the electric vehicle 1 according to the present embodiment, the battery pack 70 and the power distribution device 90 are electrically connected directly, without using a high-voltage wire, as shown in FIG. 3, where the high-voltage electrodes of the battery pack 70 and the power distribution device 90 are not exposed, which contributes to safety. Further, the battery pack 70 delivers power to the power supply device 60 via the high-voltage wire running from the rear power feed port 71 provided at the rear exterior surface of the battery pack 70, where the high-voltage wire is allowed to be relatively short because the drive power supply device 60 is at a short distance from the rear exterior surface of the battery pack 70.

As described above, in the electric vehicle 1 according to the first embodiment of the present invention, the auxiliary electric device group 80, the power distribution device 90 and the battery pack 70 are arranged in this order from the front along the longitudinal direction A of the vehicle, between the side rails 11. This arrangement allows the auxiliary electric device group 80 and the power distribution device 90, between which high-voltage power is transmitted, to be electrically connected by high-voltage wires of short length, and allows the power distribution device 90 and the battery pack 70, between which high-voltage power is transmitted, to be electrically connected directly by coupling electrodes. In other words, in the electric vehicle 1 according to the first embodiment, the components between which high-voltage power is transmitted are arranged at a short distance from each other, which allows them to be connected by high-voltage wires of reduced length or without wires. This enables a simple arrangement of high-voltage wires.

Second Embodiment

The second embodiment of the present invention will be described. The electric vehicle 2 according to the second embodiment differs from the electric vehicle 1 according to the first embodiment in the manner of connecting the battery pack 70 and the power distribution device 90. The difference from the first embodiment will be described below. The components common to the first and second embodiments are given the same reference signs; the detailed description thereof will be omitted.

Figure 6:
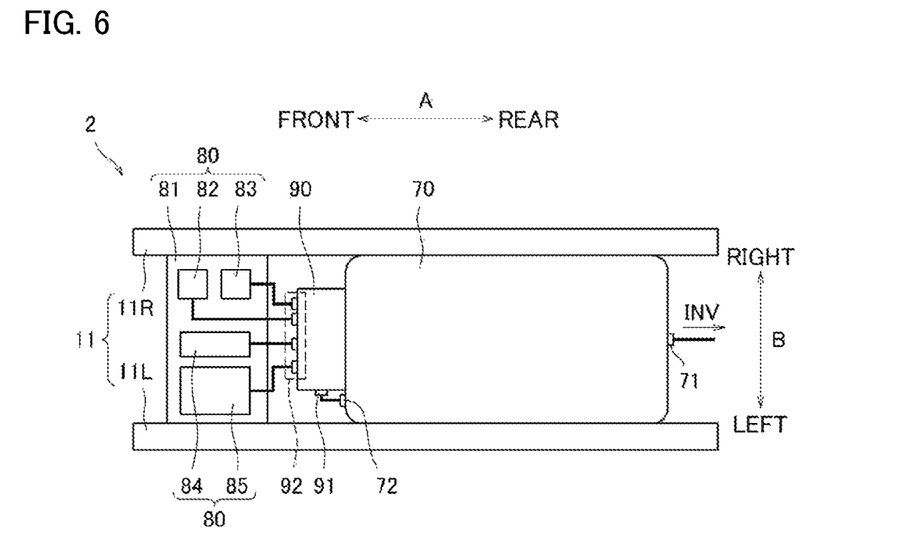
FIG. 6 is a configuration diagram schematically showing power feed lines in an electric vehicle according to a second embodiment of the present invention.

FIG. 6 is a configuration diagram schematically showing power feed lines in the electric vehicle 2 according to the second embodiment. As shown in FIG. 6, the battery pack 70 has a front power feed port 72 at the front exterior surface, where the term "front" is used in connection with the longitudinal direction A of the vehicle, to deliver DC power to the power distribution device 90. In the present embodiment, the front power feed port 72 is provided at a location not occupied by the power distribution device 90 on the front exterior surface of the battery pack 70.

The power input 91 of the power distribution device 90 is provided at the surface thereof. Thus, the front power feed port 72 of the battery pack 62 and the power input 91 of the power distribution device 90 are connected by a high-voltage wire arranged outside the battery pack 70 and the power distribution device 91.

In the electric vehicle 2 according to the second embodiment, the battery pack 62 and the power distribution device 90 are electrically connected by a high-voltage wire arranged outside the battery pack 70 and the power distribution device 91, which provides increased ease of maintenance of the high-voltage wire, the front power feed port 72 and the power input 91.

Third Embodiment

The third embodiment of the present invention will be described. The electric vehicle 3 according to the third embodiment differs from the electric vehicle 1 according to the first embodiment in the arrangement of the power distribution device 90 and the manner of electrically connecting the battery pack 70 and the power distribution device 90. The difference from the first embodiment will be described below. The components common to the first and third embodiments are given the same reference signs; the detailed description thereof will be omitted.

Figure 7:
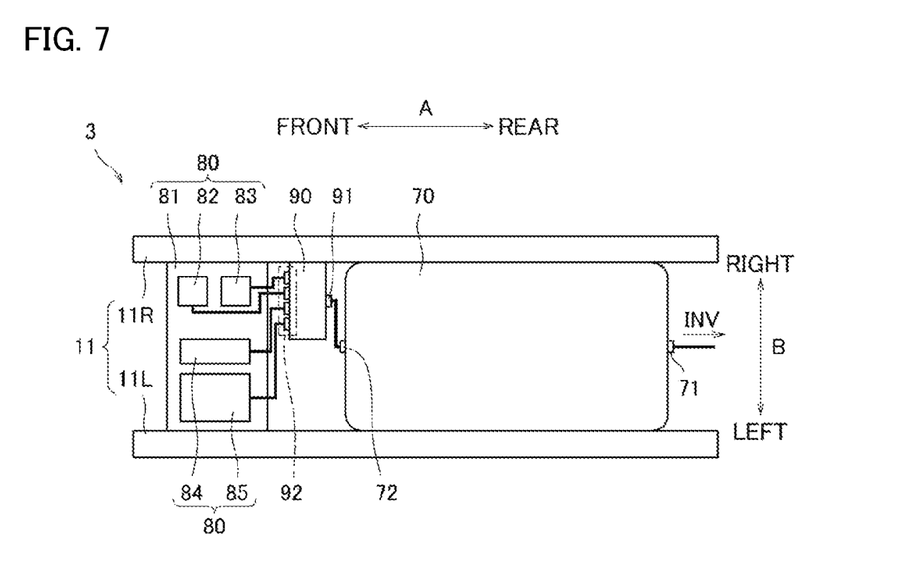
FIG. 7 is a configuration diagram schematically showing power feed lines in an electric vehicle according to a third embodiment of the present invention.

FIG. 7 is a configuration diagram schematically showing power feed lines in the electric vehicle 3 according to the third embodiment. As shown in FIG. 7, the power distribution device 90 is arranged away from the battery pack 70 and fixed to one of the side rails 11. In the present embodiment, the power distribution device 90 has a power input 91 at the surface, which is electrically connected to the front power feed port 72 of the battery pack 70 by a high-voltage wire. The electric vehicle 3 according to the third embodiment provides increased freedom of arrangement of the power distribution device 90, allowing the battery pack 70 and the power distribution device 90 to be electrically connected by a high-voltage wire of short length.

Fourth Embodiment

The fourth embodiment of the present invention will be described. The electric vehicle 4 according to the fourth embodiment differs from the electric vehicle 1 according to the first embodiment in that the power distribution device 90 is built into the battery pack 70. The difference from the first embodiment will be described below. The components common to the first and fourth embodiments are given the same reference signs; the detailed description thereof will be omitted.

Figure 8:
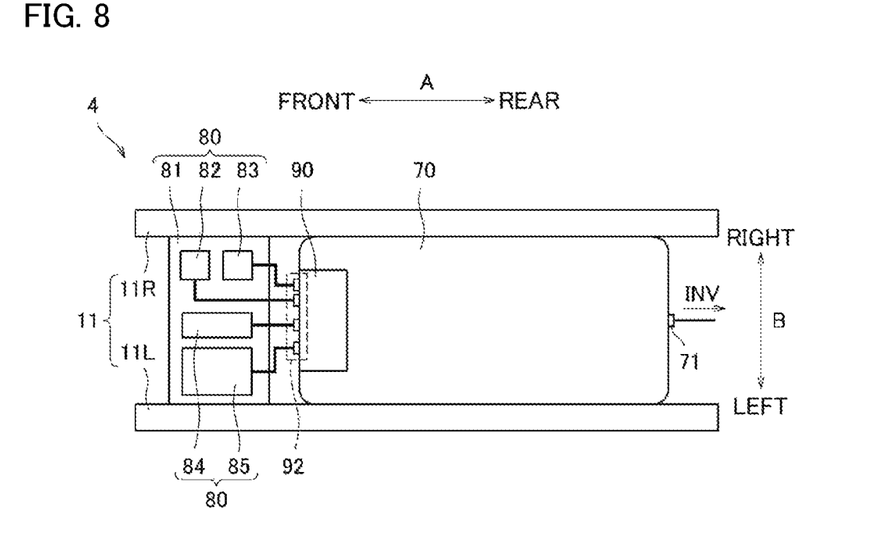
FIG. 8 is a configuration diagram schematically showing power feed lines in an electric vehicle according to a fourth embodiment of the present invention.

FIG. 8 is a configuration diagram schematically showing power feed lines in the electric vehicle 4 according to the fourth embodiment. As shown in FIG. 8, in the electric vehicle 4, the power distribution device 90 is arranged at the front interior surface of the battery pack 70, where the term "front" is used in connection with the longitudinal direction of the vehicle. Specifically, the power distribution device 90 is arranged within a casing of the battery pack 70 with a plurality of battery modules (not shown), and electrically connected to the battery modules. The power distribution device 90 has power outputs 92 provided to be exposed at the front exterior surface of the battery pack 70. In the electric vehicle 4 according to the fourth embodiment, the high-voltage electrical connection at which the battery pack 70 and the power distribution device 90 are electrically connected is not exposed but located within the casing of the battery pack 70, which contributes to safety.

Fifth Embodiment

The fifth embodiment of the present invention will be described. The electric vehicle 5 according to the fifth embodiment differs from the electric vehicle 1 according to the first embodiment in that it has a plurality of battery packs 70. The difference from the first embodiment will be described below. The components common to the first and fifth embodiments are given the same reference signs; the detailed description thereof will be omitted.

Figure 9:
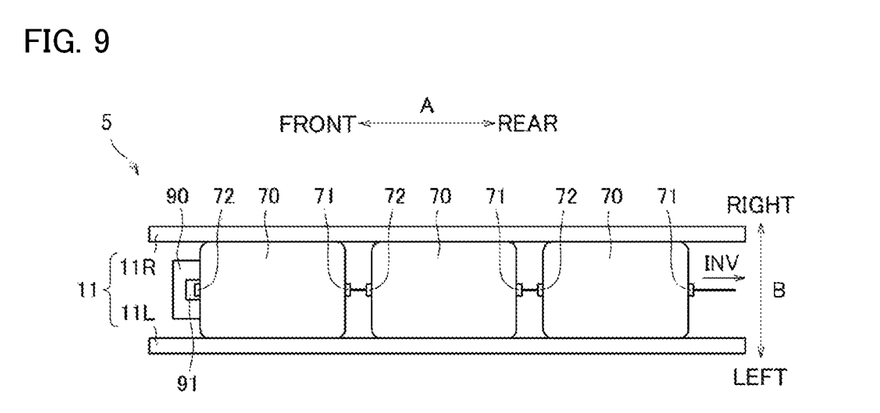
FIG. 9 is a configuration diagram schematically showing power feed lines in an electric vehicle according to a fifth embodiment of the present invention.

FIG. 9 is a configuration diagram schematically showing power feed lines in the electric vehicle 5 according to the fifth embodiment. As shown in FIG. 9, the electric vehicle 4 has a long wheel base as compared with the electric vehicle 1 according to the first embodiment, and three battery packs 70 are arranged in a row, between the side rails 11. The number of battery packs 70 arranged in the longitudinal direction A of the vehicle is not limited to three.

The battery packs 70 are connected to each other in the manner that a rear power feed port 71 of a battery pack 70 is connected to a front power feed port 72 of the adjacent battery pack 70 by a high-voltage wire of short length. The first battery pack 70 from the front is physically and electrically connected to the power distribution device 90 in the same manner as seen in the first embodiment, while the hindmost battery pack 70 is physically and electrically connected to the drive power supply device 60 in the same manner as seen in the first embodiment. Here, the terms "front" and "hindmost" are used in connection with the longitudinal direction A of the vehicle. Accordingly, the electric vehicle 5 according to the fifth embodiment, which has a plurality of battery packs, brings about advantageous effects similar to those of the electric vehicle 1 according to the first embodiment.

Sixth Embodiment

The sixth embodiment of the present invention will be described. The electric vehicle 6 according to the sixth embodiment differs from the electric vehicle 1 according to the first embodiment in that the auxiliary electric device 85 is a cooling device. The difference from the first embodiment will be described below. The components common to the first and sixth embodiments are given the same reference signs; the detailed description thereof will be omitted.

Figure 10:
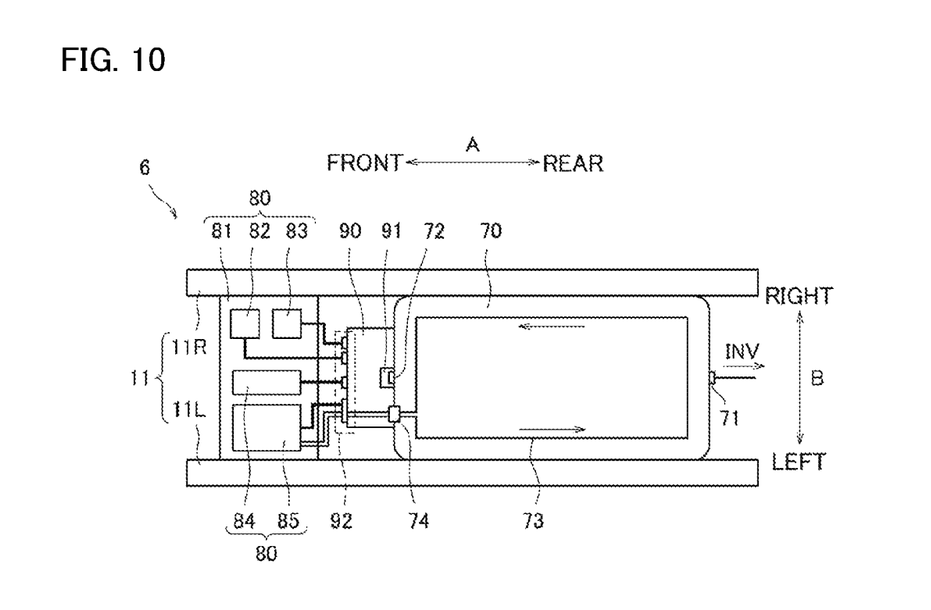
FIG. 10 is a configuration diagram schematically showing power feed lines and a cooling passage in an electric vehicle according to a sixth embodiment of the present invention.

FIG. 10 is a configuration diagram schematically showing power feed lines and a cooling line in the electric vehicle 6 according to the sixth embodiment. As shown in FIG. 10, in the electric vehicle 6, the battery pack 70 includes a cooling pipe 73 in which to circulate a coolant, and a piping port 74 at the front exterior surface through which the coolant flows into or out of the battery pack. The piping port 74 is connected to the auxiliary electric device 85 which is a cooling device, for example by an internal passage provided in the power distribution device 90 and a pipe connector (not shown) provided at the power output 92 for the cooling device. Accordingly, the electric vehicle 5 according to the sixth embodiment equipped with a battery pack 70 including a cooling pipe 73 is allowed to have a simple piping system in addition to simple power feed lines using high-voltage wires.

Seventh Embodiment

The seventh embodiment of the present invention will be described. The electric vehicle 7 according to the seventh embodiment differs from the electric vehicle 1 according to the first embodiment in the arrangement of the drive power supply device 60. The difference from the first embodiment will be described below. The components common to the first and seventh embodiments are given the same reference signs; the detailed description thereof will be omitted.

Figure 11:
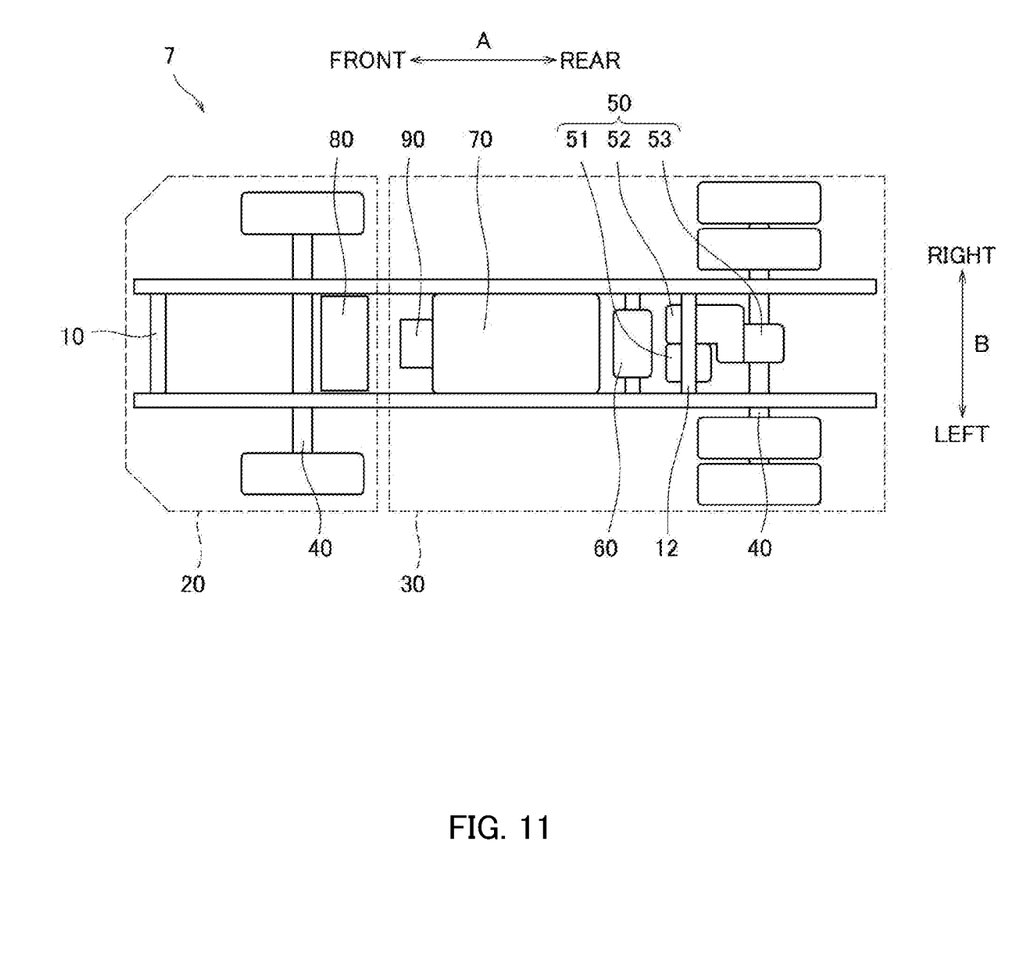
FIG. 11 is a top view schematically showing the total configuration of an electric vehicle according to a seventh embodiment of the present invention.

FIG. 11 is a top view schematically showing the total configuration of the electric vehicle 7 according to the seventh embodiment. As shown in FIG. 11, in the electric vehicle 7, the drive power supply device 60 is arranged between the battery pack 70 and the drive unit 50 in the longitudinal direction A of the vehicle. Here, the battery pack 70, the drive power supply device 60 and the drive unit 50 are connected in this order by high-voltage wires, which allows the individual high-voltage wires to be short. Thus, the electric vehicle 7 according to the seventh embodiment is allowed to have a simple arrangement of high-voltage wires as compared with the electric vehicle 1 according to the first embodiment.

REFERENCE SIGNS LIST 1 to 7 Electric vehicle
10 Ladder frame
11 Side rail
20 Cab
30 Cargo box
43 Rear wheel
44 Rear axle
50 Drive unit
51 Motor
60 Power supply device
70 Battery pack
80 Auxiliary electric device group
90 Power distribution device

The invention claimed is:

1. An electric vehicle, comprising:
a drive unit fitted to a rear axle of the electric vehicle to transmit drive power generated by a motor to rear wheels of the electric vehicle to move the electric vehicle;
an auxiliary electric device group including a plurality of auxiliary electric devices disposed in a cab area which is disposed under a cab of the electric vehicle and between side rails which constitute a ladder frame of the electric vehicle;
a battery pack disposed between the drive unit and the auxiliary electric device group and between the side rails;
a power distribution device disposed on an auxiliary electric device group side of the battery pack and between the side rails to distribute power from the battery pack to the plurality of auxiliary electric devices; and
a drive power supply device disposed on a drive unit side of the battery pack to supply power from the battery pack to the motor;
wherein the auxiliary electric device group includes a shelf structure including a plurality of shelves disposed one over another in a vertical direction of the electric vehicle and wherein the plurality of auxiliary electric devices are disposed in the shelf structure.

2. The electric vehicle according to claim 1, wherein the power distribution device is disposed away from a front exterior surface of the battery pack as viewed along a longitudinal direction of the electric vehicle.

3. The electric vehicle according to claim 1, wherein the power distribution device is disposed at a front exterior surface of the battery pack as viewed along a longitudinal direction of the electric vehicle.

4. The electric vehicle according to claim 1, wherein the power distribution device is disposed at a front interior surface of the battery pack as viewed along a longitudinal direction of the electric vehicle.

5. The electric vehicle according to claim 1, wherein the battery pack has a power feed port for feeding power to the drive power supply device and wherein the power feed port is disposed at a rear exterior surface of the battery pack as viewed along a longitudinal direction of the electric vehicle between the side rails.

6. The electric vehicle according to claim 1, wherein the battery pack has a piping port through which a coolant circulating in the battery pack flows into or out of the battery pack and wherein the piping port is disposed at a front exterior surface of the battery pack as viewed along a longitudinal direction of the electric vehicle.

7. The electric vehicle according to claim 1, wherein the drive power supply device is disposed in front of the drive unit as viewed along a longitudinal direction of the electric vehicle.

* * * * *